United States Patent
Denslow

[11] 4,006,707
[45] Feb. 8, 1977

[54] ULTRASONIC COATING APPARATUS
[75] Inventor: Clark A. Denslow, Wilton, Conn.
[73] Assignee: Branson Ultrasonics Corporation, New Canaan, Conn.
[22] Filed: May 10, 1976
[21] Appl. No.: 684,472
[52] U.S. Cl. .............................. 118/612; 118/421; 228/1 A; 259/DIG. 44; 310/8.3
[51] Int. Cl.$^2$ .......................................... B05C 3/04
[58] Field of Search ............ 118/612, 57, 421, 429, 118/400; 228/1 A; 259/DIG. 44; 310/8.3; 68/355; 134/1; 427/57

[56] References Cited
UNITED STATES PATENTS

| 2,724,666 | 11/1955 | Myers | 259/DIG. 44 |
|---|---|---|---|
| 2,771,047 | 11/1956 | Zimmerman | 118/421 X |
| 2,820,263 | 1/1958 | Fruengel | 259/DIG. 44 |
| 2,857,878 | 10/1958 | Matson et al. | 118/421 |
| 2,902,971 | 9/1959 | Roeder et al. | 118/421 X |
| 3,123,305 | 3/1969 | Eisenkraft | 259/DIG. 44 |
| 3,368,085 | 2/1968 | McMaster et al. | 310/8.3 |
| 3,385,262 | 5/1968 | Jacke et al. | 118/429 |
| 3,752,381 | 8/1973 | Watson, Jr. | 228/1 A |
| 3,945,618 | 8/1974 | Shoh | 259/DIG. 44 |

FOREIGN PATENTS OR APPLICATIONS 719,386  12/1954  United Kingdom ............... 228/1 A Primary Examiner—Morris Kaplan
Attorney, Agent, or Firm—Ervin B. Steinberg; Philip J. Feig

[57] ABSTRACT

A resonator dimensioned to be resonant along its longitudinal axis at a predetermined frequency of vibration includes a liquid retaining recess therein disposed at or near an antinodal region of longitudinal motion. An electroacoustic converter coupled to one end of the resonator renders the resonator resonant at its predetermined high frequency for activating a liquid, such as molten solder, disposed in the liquid retaining means to effect soldering a workpiece immersed in the liquid of the retaining means. Means move said resonator between a storage tank, whereat to charge said recess, and working position whereat to effect said workpiece treatment.

3 Claims, 6 Drawing Figures

ULTRASONIC COATING APPARATUS

BRIEF SUMMARY OF THE INVENTION

This invention refers to apparatus for soldering or coating a workpiece using high frequency vibrations. More specifically, this invention concerns a novel half wavelength resonator construction which includes an aperture in the form of a liquid retaining cup disposed at an antinodal region of the vibratory motion traveling along the longitudinal axis of the resonator. A molten metal, such as solder, is used to fill the cup. The resonator upon being rendered resonant at a sonic or ultrasonic frequency (high frequency) activates the solder to cause coating of a workpiece immersed in the activated solder.

The benefits derived from using sonic or ultrasonic energy in conjunction with a liquid solder bath have been described in the prior art, see for instance, U.S. Pat. No. 2,397,400, H. Harwich, dated Mar. 26, 1946; U.S. Pat. No. 3,385,262, S. E. Jacke et al., dated May 28, 1968 and U.S. Pat. No. 3,833,163, C. A. Denslow et al., dated Sept. 3, 1974.

As is known from the prior art, solder joints can be made most effectively by means of an ultrasonically activated solder bath. The ultrasonic energy erodes the tenacious oxide layer normally present at the workpiece surface and causes a clean oxide-free surface with which the soldier combines for providing a sound metallurgical bond. The bond is formed without the use of flux which, in many instances, is objectionable. Favorable results using an ultrasonically activated solder bath have been achieved when soldering or coating workpieces made of aluminum or copper.

In certain in-line processing applications it is undesirable to immerse the workpiece in a large heated solder bath. For example, when the workpiece is heat sensitive or when only a small portion of a workpiece, such as an electrical terminal, is to be soldered or coated, disposing the entire workpiece in a solder bath can cause damage. One method of overcoming this problem in the past has been to provide a soldering station at which a small quantity of molten solder is brought from a large solder tank to the workpiece terminal to be soldered (hereinafter referred to as cup soldering method). In accordance with the present invention, the soldering operation at the work station is performed with the aid of ultrasonic activation.

The present invention provides for the use of a half wavelength resonator having two ends dimensioned to be resonant at a predetermined high frequency in the range between 1 kHz and 100 kHz. One end of the resonator is coupled to an electroacoustic converter which when energized with electrical energy of the predetermined frequency converts the applied electrical energy to mechanical vibratory motion.

The other end of the resonator, disposed substantially at an antinodal region of longitudinal motion, is provided with a recess in the shape of a cup for retaining liquid therein. This latter end of the resonator is periodically dipped into a large pool of liquid, such as molten solder, for replenishing the solder in the cup and for preventing the solidification of the solder retained in the cup. After the cup is filled with solder and removed from the pool, the workpiece is placed in the cup and the converter is energized for rendering the resonator resonant. The vibratory energy transmitted to the cup causes high frequency activation and cavitation of the solder for providing improved soldering and coating of the workpiece surface. In this manner the benefits of soldering using sonically or ultrasonically activated solder is achieved in conjunction with the in-line cup solder operation.

A principal object of the present invention, therefore, is the provision of an apparatus for performing an in-line cup soldering operation while sonically or ultrasonically activating the solder.

Another object of this invention is the provision of a half wavelength high frequency resonator having liquid retaining means disposed at an antinodal region of the resonator for activating a liquid disposed in the retaining means.

A further object of this invention is the provision of an apparatus for cup soldering workpieces employing high frequency vibratory energy.

Further and still other objects of the invention will become more clearly apparent when the following description is read in conjunction with the accompanying drawings.

DETAILED DESCRIPTION OF THE INVENTION

Figure 1:
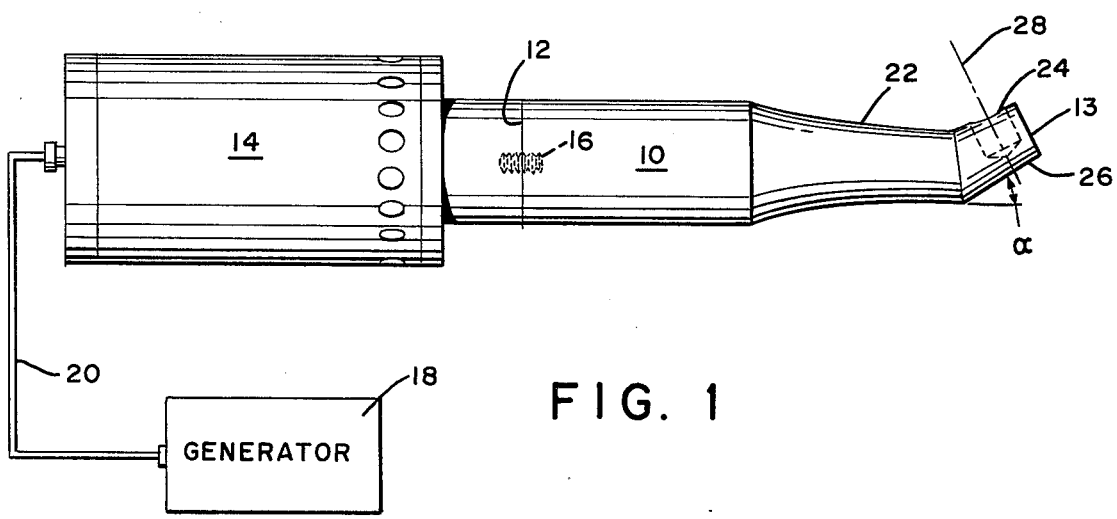
FIG. 1 is a side elevational view of a preferred embodiment of the invention.

Referring to the figures and in FIG. 1 in particular, a preferred embodiment of the invention is shown. A resonator 10 dimensioned to be resonant as a half wavelength resonator made of metal, such as steel, aluminum or titanium, is mechanically coupled at end surface 12 to an electroacoustic converter 14 via a screw 16. The electroacoustic converter 14 is connected to receive high frequency electrical energy at a predetermined frequency in the range between 1 kHz and 100 kHz, for instance at 20 kHz, from an electrical generator 18 via cable 20. The converter 14 by means of electroacoustic means such as piezoelectric or magnetostrictive means (not shown) converts the applied electrical energy into mechanical vibrations which are applied to the resonator 10, causing the latter to be resonant at its predetermined high frequency. A converter suitable for the present purpose is disclosed for instance, in U.S. Pat. No. 3,328,610, dated June 27, 1967, S. E. Jacke et al, entitled "Sonic Wave Generator," and the design of resonators, also known as horns, tools, mechanical amplitude transformers, is described in "Ultrasonic Engineering" (book) by Julian R. Frederick, John Wiley & Sons, Inc., New York, N. Y. (1965) pp. 87 to 103. The resonator 10 in the present example, is provided with a reduced cross-sectional area along its output portion as indicated by the numeral 22 for causing increased mechanical amplitude of vibration at the end region 13 which is disposed substantially at an antinodal region of longitudinal motion. The output surface of the converter 14 and the abutting input surface 12 of resonator 10 are disposed at a second antinodal region of the resonator. The medially disposed center region of the half wavelength resonator 10 is disposed at a nodal region of the longitudinal vibratory motion.

An aperture 24 is machined into the inclined portion 26 of resonator 10 near the antinodal region of longitudinal vibrating motion. Typically, the aperture has a diameter of 6.5 mm, and a depth of 10 mm and the edge of the aperture is disposed at a distance of 5 mm from the end surface 13 of the resonator 10. The acute angle α between the inclined portion 26 and the longitudinal axis of the resonator 10 is selected to cause the axis 28 through the aperture 24 to be disposed substantially normal to a horizontal plane when the converter 14 and resonator 10 are disposed at the desired angle during soldering. In this manner, when the portion 26 of resonator 10 is dipped into a tank containing a liquid, as will be discussed in conjunction with FIGS. 3 and 4, the liquid contained in the aperture 24 is retained without spillage.

Figure 2:
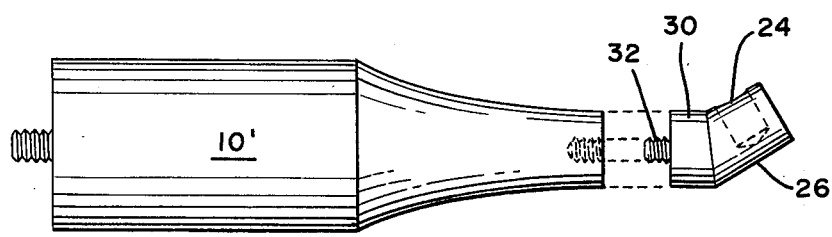
FIG. 2 is a side elevational view of an alternative embodiment of a portion of the embodiment per FIG. 1.

In FIG. 2, a modification of the resonator construction is shown wherein a tip 30 containing the aperture 24 is replaceably affixed to the resonator 10' using a threaded connection 32. By being replaceably affixed to the resonator 10', tips 30 containing apertures 24 of different size and inclined surfaces can be substituted without readjustment of the solder apparatus per FIGS. 3 and 4.

In the preferred resonator embodiment which includes an inclined portion 26 only the frontal region 26 of the resonator 10 is disposed in the solder bath. This feature results in a relatively small temperature rise of the resonator 10 and converter 14.

A resonator without an inclined surface 26 is also feasible for practicing the invention. The aperture is machined into the resonator at an angle normal to the longitudinal axis of the resonator. When filling the liquid retaining aperture, a greater portion of the resonator must be immersed into the molten solder bath, hence causing a greater temperature rise of the resonator and converter. The increased heating effect requires the use of additional cooling means for preventing damage to the converter.

Figure 3:
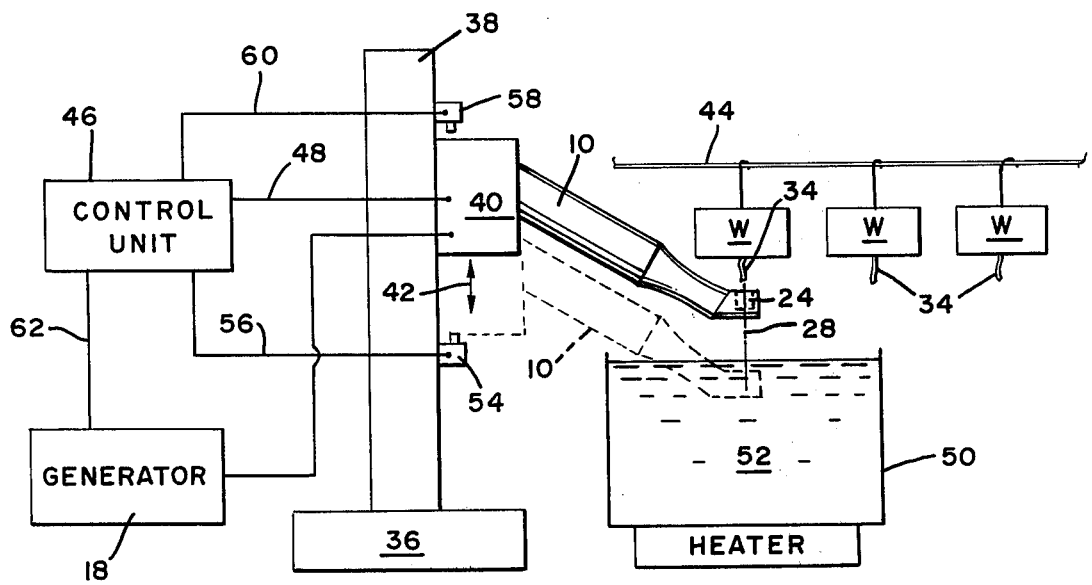
FIG. 3 is an elevational view of an embodiment of the invention for use in in-line processing.

A typical arrangement for soldering the terminals 34 of workpieces W is illustrated in FIG. 3. A base 36 having an upright support 38 extending therefrom supports the converter 14 and resonator 10. The converter 14 and resonator 10 are disposed to cause the longitudinal axis 28 through the aperture 24 to be substantially vertical. The method of mounting the converter to the upright support 38 does not form a part of the invention and may be accomplished using any of the methods known in the art. In the present embodiment, such coupling is schematically represented by a mounting block 40. Block 40, moreover, includes motive means (not shown) for causing the resonator 10 to reciprocate vertically along the upright support 38 is indicated by the double headed arrow 42.

Furthermore, workpieces W having depending terminals 34 to be soldered are carried by conveying means 44 past the work station. The workpieces may also be carried on a rotary table or any other conveyance apparatus. The workpieces prior to reaching the soldering station have been preheated and the insulation on terminals 34 has been removed. The preparatory operations are not necessary in all cases for proper soldering of the terminals 34. In accordance with the present invention, workpieces may be soldered in the first instance without such prior preparation.

To solder the terminals 34, control unit 46 provides a signal along conductor 48 to the mounting block 40 for causing the resonator assembly to travel downwards toward a tank 50 containing a liquid such as molten solder 52. The tip 26 of the resonator 10 becomes submerged in the solder, as shown by the dotted lines, causing the aperture 24 to become filled with solder. When the block 40 reaches limit switch 54, a signal along conductor 56 to the control unit 46 causes a further signal to be conducted along conductor 48 to reverse the direction of motion of mounting block 40.

The resonator 10 begins to travel upward with the aperture 24 now filled with liquid solder. The resonator 10 described above is disposed at an angle for minimizing spillage of solder from the aperture 24. As the resonator 10 travels upward, the terminals 34 of a respective workpiece W enter the aperture 24 and the solder therein. When the terminals 34 are at the proper depth within the aperture 24, the block 40 contacts the limit switch 58, causing a signal to be manifest along conductor 60 to the control unit 46. The control unit 46, in turn, causes a signal to be manifest along conductor 62 to actuate the electrical high frequency generator 18.

The generator 18, as described in conjunction with FIG. 1 causes the resonator 10 to become resonant at the predetermined high frequency. The aperture 24 and solder therein receive the vibratory energy and, hence, the solder is activated with high frequency energy. After a dwell time, sufficient for causing a soldered connection, signals from control unit 46 cause the electrical generator to cease providing electrical energy to the converter 14 and cause the block 40 to descend for replenishing the solder in aperture 24, and for preventing the solder in the aperture 24 from solidyifying. The cycle is repeated for each subsequent workpiece carried to the soldering work station by the conveying means.

Modifications to the embodiment per FIG. 3 are possible. For example, the limit switches 54 and 58 can be eliminated and the control unit 46 can be programmed for actuating the mounting block 40 after predetermined travel time intervals. Moreover, the control unit 46 can be programmed to replenish the solder in aperture 24 only after several workpieces have been soldered.

Figure 4:
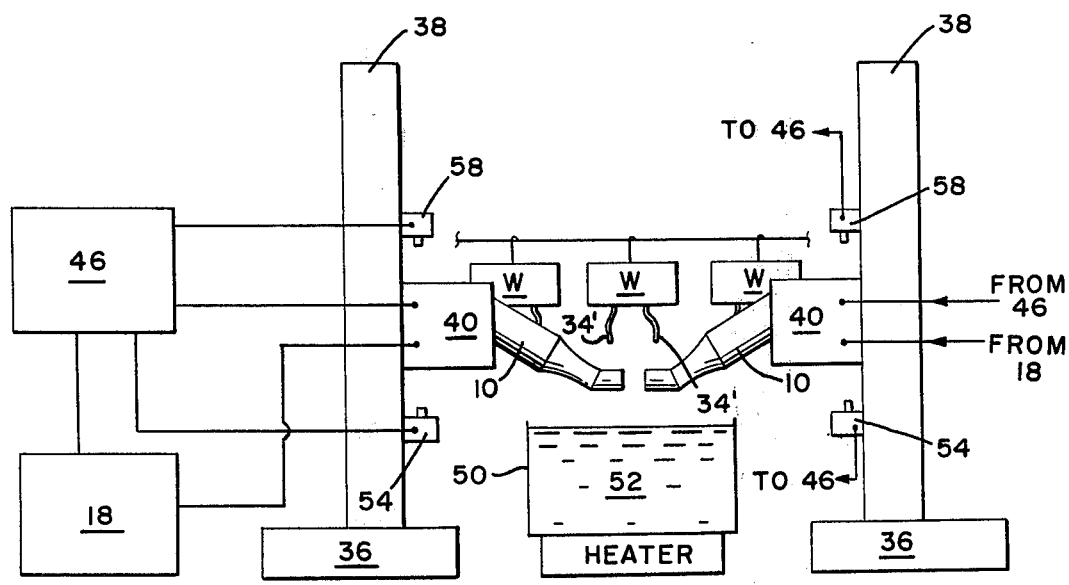
FIG. 4 is an elevational view of an alternative embodiment of the invention per FIG. 3.

In a further modification, most useful for soldering workpieces having a plurality of terminals 34' to be soldered, two or more apparatus per FIG. 3 are positioned in close proximity to each other, see FIG. 4. The two appartus are controlled by a single control unit and the respective converters are energized by a single electrical generator 18. In this latter embodiment, each of the terminals 34' will be disposed simultaneously in a respective aperture 24 of a particular resonator 10.

Figures 5, 6:
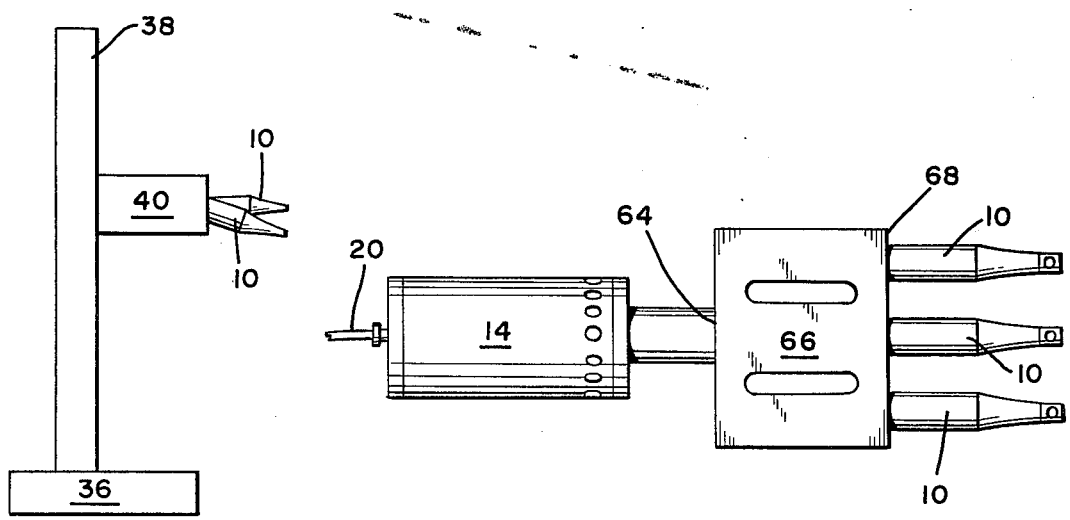
FIG. 5 is a further alternative embodiment of the invention per FIG. 3.
FIG. 6 is a still further alternative embodiment of the invention per FIG. 3.

In another modification per FIG. 5, a plurality of converters and associated resonators are disposed on a single apparatus. The resonators 10 are arranged so that terminals 34 or 34' to be soldered are disposed simultaneously in respective apertures 24.

In a still further modification requiring the use of only one relatively expensive converter 14 for energizing a plurality of resonators 10 is shown in FIG. 6. The converter 14 is coupled to the input surface 64 an intermediate coupling member 66 dimensioned to be resonant as a half wavelength resonator. A plurality of resonators 10 are coupled to the output surface 68 of the intermediate coupling member 66. The illustrated assembly is employed as described in conjunction with FIG. 5 in which the several terminals 34' are simultaneously disposed in apertures 24. All of the resonators 10 simultaneously become resonant responsive to the converter 14 being energized.

In the foregoing description, the preferred liquid is solder but it will be apparent to one skilled in the art that any liquid such as an aqueous solution, a solvent or the like can be employed in an ultrasonic cleaning or processing apparatus when using the resonator construction described.

While there have been described and illustrated several embodiments of the invention, further and still other modifications may be made without deviating from the broad principle of the present invention which shall be limited solely by the scope of the appended claims.

What is claimed is:

1. An ultrasonic processing apparatus comprising:
    a support;
    a tank adapted for holding a liquid;
    an elongated resonator dimensioned to be resonant along its longitudinal axis at a predetermined high frequency of vibration having two ends;
    electroacoustic converter means coupled to said resonator at one end thereof for imparting vibrations of said predetermined frequency to said resonator and causing said resonator when resonant to exhibit at least two antinodal regions and one nodal region of longitudinal vibration;
    said resonator including a liquid retaining recess formed therein at said other end substantially at an antinodal region of longitudinal vibration, and
    motive means coupled to said electracoustic converter means and said elongated resonator for periodically moving said resonator along said support for causing said liquid retaining recess to become submerged in the liquid of said tank for replenishing the liquid in said liquid retaining recess and for lifting said resonator after replenishing the liquid in said liquid retaining recess.

2. An ultrasonic apparatus as set forth in claim 1, the longitudinal axis of said liquid retaining recess being disposed at an acute angle relative to the longitudinal axis of said resonator.

3. An ultrasonic apparatus as set forth in claim 1, said resonator being coupled with respect to said support for providing that the longitudinal axis of said liquid retaining recess is aligned substantially normal to the horizontal plane.

* * * * *